US010715258B1

(12) United States Patent
Melikyan et al.

(10) Patent No.: US 10,715,258 B1
(45) Date of Patent: Jul. 14, 2020

(54) OPTICAL COHERENT RECEIVER

(71) Applicant: Nokia Solutions and Networks Oy, Espoo (FI)

(72) Inventors: Argishti Melikyan, Matawan, NJ (US); Po Dong, Morganville, NJ (US)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 16/402,558

(22) Filed: May 3, 2019

(51) Int. Cl.
   H04B 10/61    (2013.01)
   H04B 10/67    (2013.01)
   H04B 10/60    (2013.01)
   H04B 10/69    (2013.01)
   H04J 14/06    (2006.01)

(52) U.S. Cl.
   CPC ....... *H04B 10/614* (2013.01); *H04B 10/6165* (2013.01); *H04B 10/6166* (2013.01); *H04J 14/06* (2013.01); *H04B 10/60* (2013.01); *H04B 10/61* (2013.01); *H04B 10/616* (2013.01); *H04B 10/67* (2013.01); *H04B 10/671* (2013.01); *H04B 10/672* (2013.01); *H04B 10/673* (2013.01); *H04B 10/69* (2013.01); *H04B 10/691* (2013.01)

(58) Field of Classification Search
   None
   See application file for complete search history.

(56) References Cited

U.S. PATENT DOCUMENTS

| 10,205,535 B1 | 2/2019 | Baehr-Jones | |
| 2004/0114939 A1* | 6/2004 | Taylor | H04B 10/61 398/152 |

(Continued)

FOREIGN PATENT DOCUMENTS

WO    2018213251 A1    11/2018

OTHER PUBLICATIONS

Xie, et al.; "Colorless coherent receiver using 3×3 coupler hybrids and single-ended detection"; Optics Express; vol. 20, No. 2; Jan. 16, 2012; https://www.osapublishing.org/oe/fulltext.cfm?uri=oe-20-2-1164&id=226196; pp. 1164-1171.

(Continued)

*Primary Examiner* — Darren E Wolf

(57) ABSTRACT

An apparatus including first, second, third and fourth photodiodes, optical mixer and first and second optical power splitters. The optical mixer has two or more input ports, three output ports to output first, second and third mixtures of light corresponding to input light received from the input ports and transferred to the output ports. The first splitter has an input port and first and second output ports, to transmit part of one of the mixtures of light from one of the output ports to the first photodiode and a remaining part of the one mixture of light from the other one of the output ports to the third photodiode. The second splitter has an input port and first and second output ports, the second splitter to transmit part of another one of the mixtures of light from one of the output ports to the first photodiode and a remaining part of the other one of the mixtures of light from the other one of the output ports to the fourth photodiode. The third output port of the optical mixer is connected to transmit a different one of the mixtures of light to the second photodiode.

20 Claims, 3 Drawing Sheets

(56) References Cited

U.S. PATENT DOCUMENTS

Figure 1:
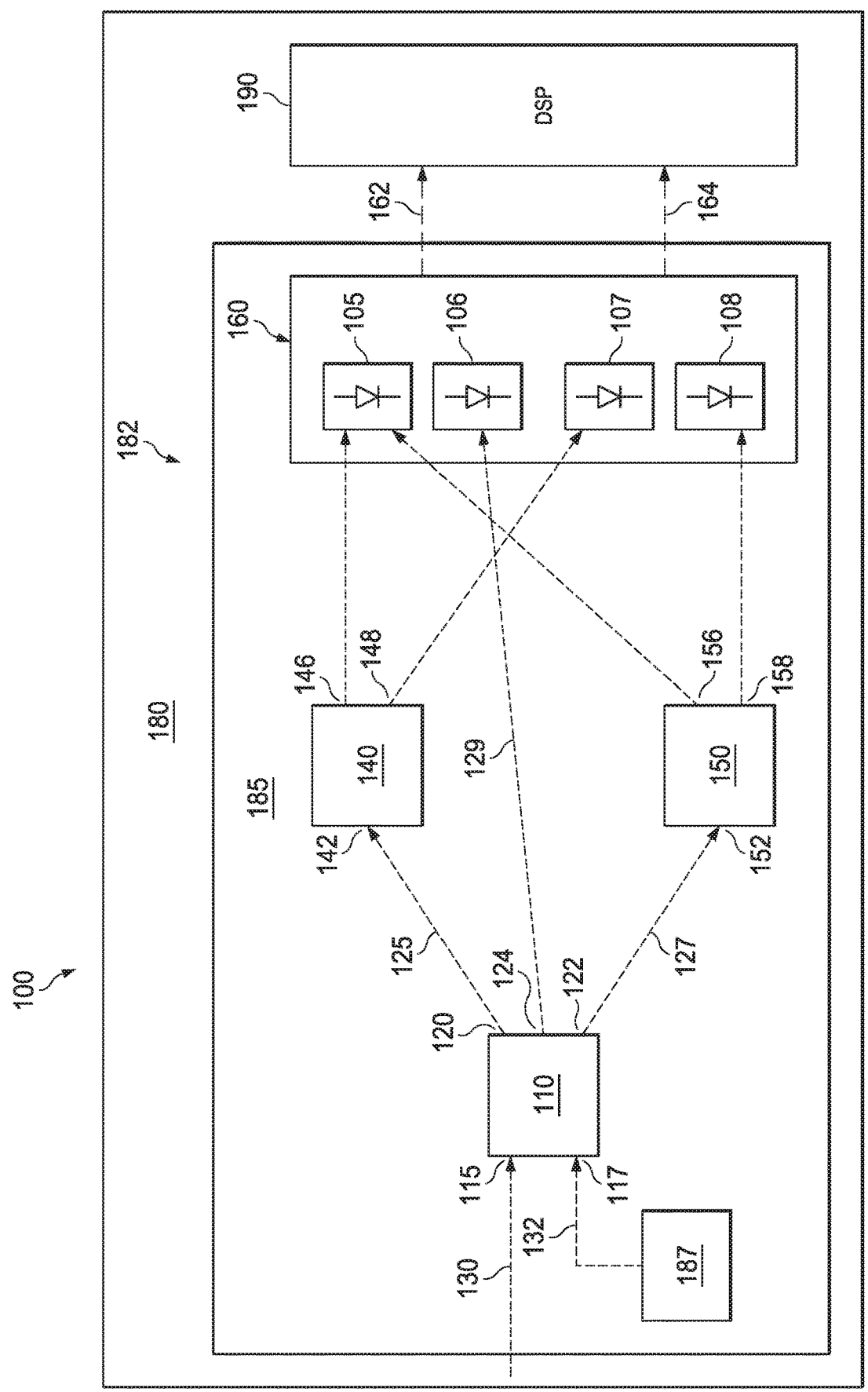

| | | | | |
|---|---|---|---|---|
| 2008/0152361 A1* | 6/2008 | Chen | ............... | H04B 10/61 |
| | | | | 398/205 |
| 2012/0213532 A1* | 8/2012 | Hironishi | .......... | H04B 10/6161 |
| | | | | 398/208 |
| 2012/0288286 A1* | 11/2012 | Houtsma | ............. | H04B 10/613 |
| | | | | 398/202 |
| 2014/0050233 A1 | 2/2014 | Yu et al. | | |

OTHER PUBLICATIONS

Erkilinc, et al.; "Comparison of Low Complexity Coherent Receivers for UDWDM-PONs (λ-to-the-user)"; Journal of Lightwave Technology; 2018; https://arxiv.org/pdf/1711.02043.pdf; pp. 1-12.

Ciaramella; "Polarization-Independent Receivers for Low-Cost Coherent OOK Systems"; IEEE Photonics Technology Letters; vol. 26, No. 6; Mar. 15, 2014; pp. 548-551.

Houtsma, et al.; "Bi-directional 25G/50G TDM-PON with Extended Power Budget using 25G APD and Coherent Detection"; Journal of Lightwave Technology; vol. 36, No. 1; 2018; 6 pgs.

Artiglia, et al.; "Polarization-Independent Coherent Real-Time Analog Receiver for PON Access Systems"; http:/www.ieee.org/ublications.standards/publications/rights/index.html; Journal of Lightwave Technology; Vo. 34, No. 8; Apr. 15, 2016; pp. 2027-2033.

\* cited by examiner

OPTICAL COHERENT RECEIVER

TECHNICAL FIELD

The invention relates, in general, to an apparatus and, more specifically, to an optical apparatus for the coherent detection of phase modulated optical signals.

BACKGROUND

This section introduces aspects that may help facilitate a better understanding of the inventions. Accordingly, the statements of this section are to be read in this light and are not to be understood as admissions about what is prior art or what is not prior art.

Next generation optical access networks would benefit from sensitivity and capacity improvement in support of 5G technology to fulfil desired reduced latency and higher bit rates. The coherent detection of phase modulated signals, such as QAM or PSK optical signals modulated according to phase-shift keying (PSK), quadrature-phase-shift-keying (QPSK), and quadrature-amplitude-modulation (QAM) constellations, areis a promising approaches to improve sensitivity and information capacity.

SUMMARY

A first embodiment includes an apparatus, the apparatus including first, second, third and fourth photodiodes, an optical mixer and first and second optical power splitters. The optical mixer has two or more optical input ports, three optical output ports and is configured to output first, second and third mixtures of light, respectively, corresponding to input light received from the optical input ports, and transferred to the optical output ports. The first optical power splitter has an input optical port and first and second optical output ports, the first optical power splitter being optically configured to transmit part of one of the mixtures of light from one of the optical output ports of the first optical power splitter to the first photodiode and to transmit a remaining part of the one of the mixture of light from the other one of the optical output ports of the first second optical power splitter to the third photodiode. The second optical power splitter has an input optical port and first and second optical output ports, the second optical power splitter being optically configured to transmit part of another one of the mixtures of light from one of the optical output ports of the second optical power splitter to the first photodiode and to transmit a remaining part of the other one of the mixtures of light from the other one of the optical output ports of the second optical power splitter to the fourth photodiode. The third output port of the optical mixer is connected to transmit a different one of the mixtures of light to the second photodiode.

In some embodiments the apparatus may include an electrical circuit connected to the first, second, third and fourth photodiodes such that the electrical circuit s configured to output a first signal indicative of a difference of optical powers measured by the first and second photodiodes and to output a second signal indicative of a difference of optical powers measured by the third and fourth photodiodes.

In some embodiments of the apparatus, the first photodiode and the second photodiode are electrically connected to each other in series, and wherein the third photodiode and the fourth photodiode are electrically connected to each other in series.

In some embodiments of the apparatus, the first and second photodiodes are configured as a first balanced detector wherein the first photodiode and the second photodiode are electrically connected to each other in series, and the third and fourth photodiodes are configured as a second balanced detector wherein the third photodiode and the fourth photodiode are electrically connected to each other in series.

In some embodiments of the apparatus, electrical output from a series connection between the first and second photodiodes outputs the first signal and electrical output from the series connection between the third and fourth photodiodes outputs the second signal.

Some embodiments of the apparatus can further include first and second differential amplifiers, the first and second photodiodes being connected to different inputs of the first differential amplifier, and third and fourth photodiodes being connected to different inputs of the second differential amplifier.

In some embodiments of the apparatus, the first and second differential amplifiers are each configured as transimpedance amplifiers.

Some embodiments of the apparatus can further include a substrate having a planar major surface, the optical mixer and the first and second optical power splitters being monolithically integrated to the substrate along the planar major surface.

Some embodiments of the apparatus can further include a substrate having a planar major surface, the optical mixer and the optical power splitters being monolithically integrated to the substrate along the planar major surface and the electrical circuit located on the planar major surface.

Some embodiments of the apparatus can include a coherent optical receiver, the coherent optical receiver including the first, second, third and fourth photodiodes, the optical mixer, and the optical power splitters, and a local optical oscillator connected to transmit light to one of the optical input ports of the optical mixer.

Some embodiments of the apparatus can include a local optical oscillator and wherein one of the optical inputs of the optical mixer is configured to receive a data-modulated optical signal from an optical fiber and another of the optical inputs of the optical mixer is connected to receive light from the local-oscillator.

In some embodiments of the apparatus, one of the first signal or second signal correspond to measurements of two linearly independent combinations of the in-phase and quadrature-phase components of the data-modulated optical signal.

In some embodiments of the apparatus the first, second and third mixtures of light, output by the optical mixer have a same intensity therein of light received at one of the input ports of the optical mixer.

In some embodiments of the apparatus two of the mixtures of light, output by the optical mixer combined light from the input ports of the optical mixer with relative phases of about +120 degrees and about −120 degrees In some embodiments of the apparatus the photodiodes are separately connected to the optical mixer output ports or the first and second power splitters output ports by output waveguides have a substantially same optical path length as each other.

In some embodiments the apparatus may include a digital signal processor configured to determine a data stream modulated onto an optical carrier received at one of the optical input ports of the optical mixer based on the first and second signals output by the electrical circuit.

In some embodiments of the apparatus one or both of the first and second optical input waveguides are optically coupled to a polarization tracker configured to align a polarization component of two or more input lights.

In some embodiments of the apparatus the optical mixer is a multi-mode interferometric coupler.

In some embodiments of the apparatus the optical mixer includes three waveguide cores, each of the three waveguide cores optically end-coupled to different ones of the optical output ports, wherein the three waveguide cores are configured to mix the input light received from the first and second optical input ports of the optical mixer.

BRIEF DESCRIPTION

Figure 2:
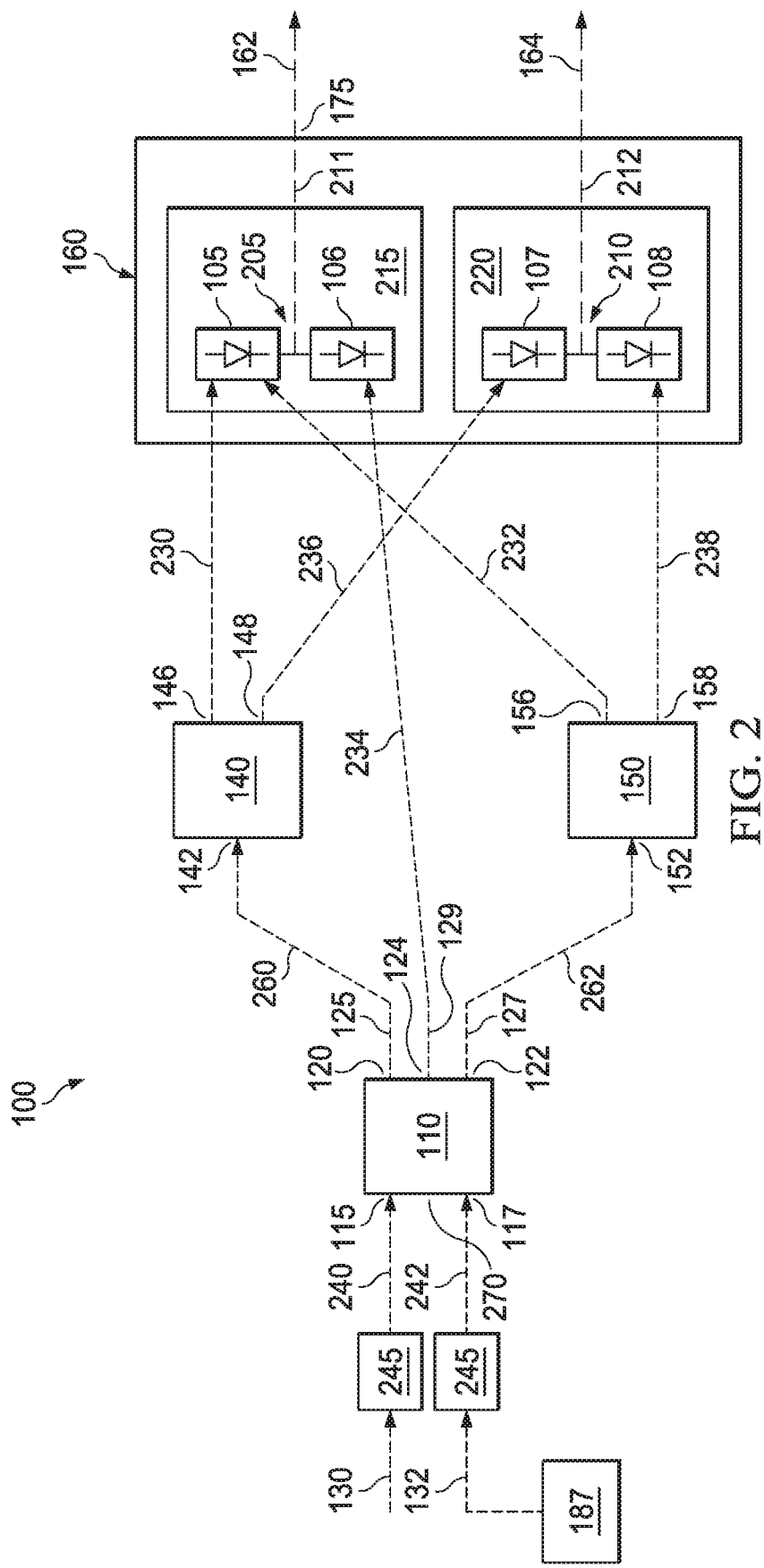
Figure 3:
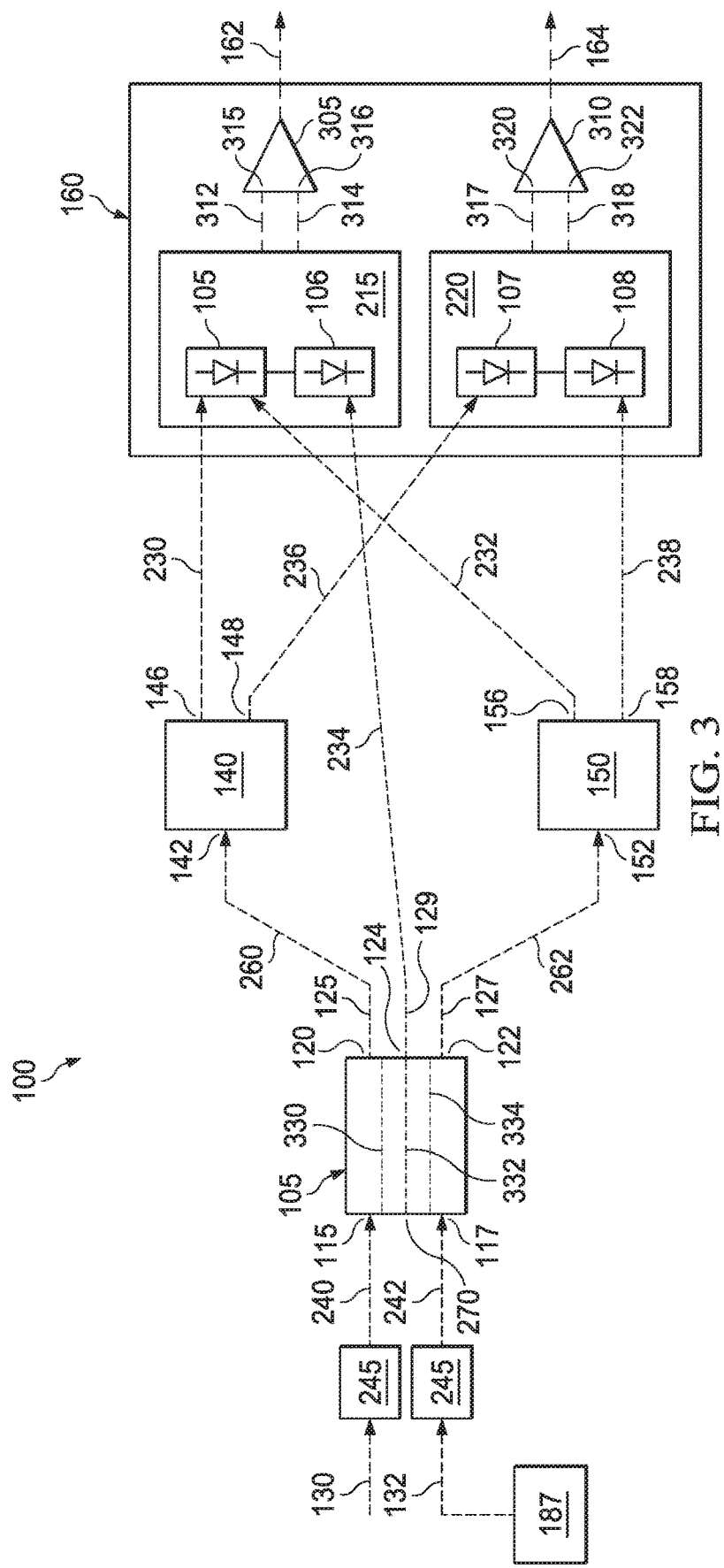

The embodiments of the disclosure are best understood from the following detailed description, when read with the accompanying FIGUREs. Some features in the figures may be described as, for example, "top," "bottom," "vertical" or "lateral" for convenience in referring to those features. Such descriptions do not limit the orientation of such features with respect to the natural horizon or gravity. Various features may not be drawn to scale and may be arbitrarily increased or reduced in size for clarity of discussion. Reference is now made to the following descriptions taken in conjunction with the accompanying drawings, in which:

FIG. 1 presents a block diagram of an example apparatus of the disclosure;

FIG. 2 presents a schematic layout of an example apparatus of the disclosure, including any embodiments of the apparatus discussed in the context of FIG. 1; and FIG. 3 presents a schematic layout of another example embodiment of the apparatus of the disclosure, including any embodiments of the apparatus discussed in the context of FIG. 1.

In the Figures and text, similar or like reference symbols indicate elements with similar or the same functions and/or structures.

In the Figures, the relative dimensions of some features may be exaggerated to more clearly illustrate one or more of the structures or features therein.

Herein, various embodiments are described more fully by the Figures and the Detailed Description. Nevertheless, the inventions may be embodied in various forms and are not limited to the embodiments described in the Figures and Detailed Description of Illustrative Embodiments.

DETAILED DESCRIPTION OF ILLUSTRATIVE EMBODIMENTS

The description and drawings merely illustrate the principles of the inventions. It will thus be appreciated that those skilled in the art will be able to devise various arrangements that, although not explicitly described or shown herein, embody the principles of the inventions and are included within their scope. Furthermore, all examples recited herein are principally intended expressly to be for pedagogical purposes to aid the reader in understanding the principles of the inventions and concepts contributed by the inventor(s) to furthering the art, and are to be construed as being without limitation to such specifically recited examples and conditions. Moreover, all statements herein reciting principles, aspects, and embodiments of the inventions, as well as specific examples thereof, are intended to encompass equivalents thereof. Additionally, the term, "or," as used herein, refers to a non-exclusive or, unless otherwise indicated. Also, the various embodiments described herein are not necessarily mutually exclusive, as some embodiments can be combined with one or more other embodiments to form new embodiments.

Embodiments of the invention benefit from our recognition that an N×3 optical mixer (i.e., with integer N equal to or greater than 2), optical power splitters and photodiodes can be used as part of an apparatus for the coherent detection of phase modulated optical signals. As further disclosed below, light carrying data-modulated and local oscillator optical signals can be passed through an N×3 optical mixer, and optical splitters to facilitate various types of interference mixtures of light signals in optical domain with minimal optical power losses so that subsequent detection of such mixtures, e.g., via photodiode circuits generate electrical outputs indicative of in-phase (I) and quadrature (Q) signal components of the data carrying one of the light signals. This, in-turn, advantageously allows for the elimination of certain expensive and/or high power-consuming electronic digital signal processing components (e.g., RF power adders and subtractors, electrical filters and analog-to-digital converters) to digitally decode the optical signals and to add and subtract the electronic digital forms of the electrical measurements of intensities of light signals in some known structures for coherent optical receivers. Additionally, at least in some embodiments, the number of analog-to-digital converter device (ADC) needed to time-sample and, thus digitize the resulting electrical signals produced by analog photodetector circuits and/or electrical amplifiers embodiments of disclosure can be reduced to two ADCs to generate the electrical output signals corresponding to in-phase (I) and quadrature (Q) signal components.

FIG. 1 presents a block diagram of an example apparatus 100 of the disclosure. With continuing reference to FIG. 1 throughout, the apparatus 100 includes first, second, third and fourth photodiodes 105, 106, 107, 108 and an optical mixer 110. The optical mixer 110 has two or more optical input ports 115, 117, and three optical output ports 120, 122, 124 (e.g., three or more output ports). The three optical output ports 120, 122, 124 are configured to output first, second and third mixtures of light 125, 127, 129, respectively, corresponding to input light 130, 132, received from the optical input ports 115, 117, and transferred to the optical output ports 120, 122, 124.

The apparatus 100 also includes a first optical power splitter 140 having an input optical port 142 and first and second optical output ports 146, 148. The first optical power splitter 140 is optically configured to transmit part of one of the mixtures of light mixture 125, received from the first output port 120 of the optical mixer 110, via the first optical output port 146 to the first photodiode 105 and to transmit a remaining part of the one mixture of light 125, via the second optical output port 148 to the third photodiode 107.

In some embodiments, for example, the first optical power splitter 140 is optically configured to transmit part of one of the mixtures of light (e.g., part of the first light mixture 125 from output port 120) from one of the optical output ports (e.g., the first optical output port 146) to the first photodiode 105 and to transmit a remaining part of the one mixture of light (e.g., a remaining part of the light mixture 125) from the other one of the optical output ports (e.g., the second optical output port 148) to the third photodiode 107.

The apparatus 100 further include a second optical power splitter 150 having an input optical port 152 and first and second optical output ports 156, 158. The second optical power splitter 150 is optically configured to transmit part of another one of the mixtures of light 127, received from the second optical output port 122 of the optical mixer 110, via the first optical output port 156 to the first photodiode 107 and to transmit a remaining part of the other one of the mixtures of light 127, via the second optical output port 158, to the fourth photodiode 108.

In some embodiments, for example, the second optical power splitter 150 is optically configured to transmit part of another one of the mixtures of light (e.g., part of the second light mixture 127) from one of the optical output ports (e.g., the first optical output port 156) to the first photodiode 107 and to transmit a remaining part of the other one of the mixtures of light (e.g., a remaining part of the second light mixture 127) from the other one of the optical output ports (e.g., the second optical output port 158) to the fourth photodiode 108.

The third optical output port 124 of the optical mixer 110 is connected to transmit a different one of the mixtures of light (e.g., the third light mixture 129) to the second photodiode 106.

The apparatus 100 further includes an electrical circuit 160 connected to the first, second, third and fourth photodiodes 105, 106, 107, 108. The electrical circuit 160 is configured to output a first signal 162 indicative of a difference of optical powers measured by the first and second photodiodes 105, 106, e.g., a first photodiode pair, and to output a second signal 164 indicative of a difference of optical powers measured by the third and fourth photodiodes 107, 108, e.g., a second photodiode pair.

Consider as an example, an embodiment where the first and second optical power splitters 140, 150 are both configured as symmetric 1:2 optical power splitters. Consequently, about equal parts (e.g., about one-half each) of the optical powers of the first mixture of light 125 are transmitted to the first photodiode 105, and to the third photodiode 107 to generate proportional currents (e.g., each $0.5I_1$). About equal parts of the optical powers of the second mixture of light 127 are transmitted the first photodiode 105 and the fourth photodiode 107 to generate proportional currents (e.g., each $0.5I_2$). The full power of the third light mixture 129. i.e., from the third output 129 of the optical mixer 110, is transmitted to the second photodiode to generate a proportional current (e.g., $I_3$). The first photodiode 105 is configured to generate electrical current proportional to the sum of the powers of the first output optical signals of the first power splitter 140 and the first output optical signal of the second power splitter 150 and independent of the relative phases of the first output optical signals of the first power splitter 140 and the first output optical signal of the second power splitter 150. The difference of the photocurrents produced by first and second photodiodes 105, 106 is equal to the first electrical signal 162 (e.g., $0.5I_1 + 0.5I_2 - I_3$), and, the difference of the photocurrents produced by third and fourth photodiodes 107, 108 is equal the second electrical signal 164 (e.g., $0.5I_1 - 0.5I_2$). Here, $I_1$, $I_2$, and $I_3$ are approximately the intensities of light at the first optical output 120, the second optical output 122, and the third optical output 124 122 of the optical mixer 110.

To produce the first and second signals such as described in the above paragraph, the input lights are combined with appropriate relative phases at the individual photodiodes 105 . . . 108. In one embodiment such relative phases are determined by the optical mixer 110. For example, the optical mixer 110 may be configured to output, at the first, second, and third optical output ports 120, 122, 124 different relative phase mixtures to the two optical signals received at the first and second optical inputs 115, 117. In one such example, the optical mixer 110 output a light mixture 129 at the third optical output port 124 that combines the optical signals from the two optical inputs 115, 117 without a substantial relative phase, e.g., in-phase mixing. In this example, the first and second optical outputs ports 120, 122 may combine light from the two optical light inputs 130, 132 with relative phases of about +120 degrees and −120 degrees, respectively, or alternatively, may combine the light from the two optical inputs 130, 132 with relative phases of about −120 degrees and +120 degrees, respectively.

The electrical circuit 160 can have different configurations to facilitate producing the first and second signal 162, 164.

For instance, FIG. 2 presents a schematic layout of an example embodiment of the apparatus 100. As illustrated, the first and second photodiodes 105, 106 are connected by the electrical circuit 160 as a first balanced pair of diodes 215, and the third and fourth photodiodes 107, 108 are connected by the electrical circuit 160 as a second balanced pair of diodes 220. For instance, in some embodiments, the first and second photodiodes 105, 106 can be configured as a first balanced detector 215, where the first photodiode 105 and the second photodiode 106 are electrically connected to each other in series, e.g., across a biasing voltage (unshown) via electrically conductive lines 205 of the circuit 160 connecting the first and second photodiodes 105, 106 in series. In some such embodiments, the third and fourth photodiodes 107, 108 can be configured as a second balanced detector 220 wherein the third photodiode 107 and the fourth photodiode 108 are electrically connected to each other in series, e.g., across a biasing voltage (not shown) via electrically conductive lines 210 of the circuit 160 connecting the third and fourth photodiodes 107, 108 in series. For instance, in some such embodiments, electrical output from the series connection (e.g., electrical output 211 carried in electrical lines 205) between the first and second photodiodes 105, 106 provides or corresponds to the first signal 162, and, the electrical output from the series connection (e.g., electrical output 212 carried in electrical lines 210) between the third and fourth photodiodes 107, 108 provides or corresponds to the second signal 164. The first signal 162 can correspond to a measure of a difference of the light intensities received by the first and second photodiodes 105, 106 and the second signal 164, can correspond to a measure of a difference of the light intensities received by the third and fourth photodiodes 107, 108.

For instance, FIG. 3 presents a schematic layout of another example embodiment of the apparatus 100. As illustrated, such an embodiment of the apparatus 100 can further include first and second differential amplifiers 305, 310, the first and second photodiodes 105, 106 being connected (e.g., via electrical lines 312, 314, respectively) to different inputs 315, 316 of the first differential amplifier 305, and, the third and fourth photodiodes 107, 108 being connected (via electrical lines 317, 318, respectively) to different inputs 320, 322 of the second differential amplifier 310. As further illustrated, in some such embodiments, the first and second photodiodes 105, 106 are not electrically connected to each other in series across a biasing voltage and the third and fourth photodiodes 107, 108 are not electrically connected in series across a biasing voltage. In some such embodiments, the first and second differential amplifiers 305, 310 are part of the electrical circuit 160 while in other embodiments the first and second differential amplifiers 305, 310 can be separate from the electrical circuit 160 and e.g., located on a different electrical circuit. In particular, the differential nature of the amplifiers 305 and 310 causes the output signal 162 to be indicative of differences of light intensities measured by the first and second photodiodes 105, 106 and causes the output signal 164 to be indicative of differences of light intensities measured by the third and fourth photodiodes 107, 108.

In some embodiments, the electrical signals 162, 164, can be amplified to different extents, e.g., such that the first and second signals 162, 164 have the same amplitude. In some such embodiments such as shown in FIG. 3, such differential amplification can be performed by the amplifiers 305, 310, while in other embodiments such differential amplification can be performed by additional amplifiers. For instance, the electrical signals 162, 164 shown in FIG. 2 could be connected to separate amplifiers to adjust the relative amplitudes of the signals 162, 164. However is other embodiments, such as when the first and second optical power splitters 140, 150 are configured to transmit unequal amounts of the first, second and third mixtures of light 125, 127, 129 to the photodiodes 105, 106, 107, 108 (e.g., via 30:70 or 10:90 splitters), and the first and second signals 162, 164 have different amplitudes, which in, turn may eliminate the need to use separate amplifiers to adjust the relative amplitudes of the signals 162, 164.

In some such embodiments, first and second differential amplifiers 305, 310, can each be configured as transimpedance amplifiers.

In some embodiments, the signals 162, 164 can be further processed by transmitting each of the signal 162, 164 to, e.g., provide separate low pass frequency filtering and/or processing by separate ADC devices to form digital representations of the signals 162, 164.

Returning to FIG. 1, in some embodiments, the apparatus 100 including a substrate 180 having a planar major surface 182, the optical mixer 110 and the optical power splitters 140, 150 being monolithically integrated to the substrate 180 (e.g., a silicon substrate) along the planar major surface 182. One skilled in the pertinent art would be familiar with photolithographic patterning and etching procedures to facilitate such monolithic integration. In some such embodiments the electrical circuit 160 can also be partially or fully located on the planar major surface 182.

As further illustrated, in some such embodiments, the apparatus 100 can further include a coherent optical receiver 185 that includes the first, second, third and fourth photodiodes 105, 106, 107, 108, the optical mixer 110, and the optical power splitters 140, 150, e.g., as part of a planar lightwave circuit. In some such embodiments the coherent optical receiver 185 can also include a local optical oscillator 187 connected to transmit input light 132 to the second 117 input ports of the optical mixer 110. In such embodiment, the first optical input 115 of the optical mixer 110 is connected to receive the amplitude and phase-modulated optical carrier light 130 from which the optical receiver is configured to recover a transmitted data stream. In some such embodiments the electrical circuit 160 can be part of the coherent optical receiver 185 while in other embodiments, the electrical circuit 160 can be separate from the coherent optical receiver 185 but still located on the substrate surface 182, or be separate from the substrate 180.

For instance, in some embodiments, the coherent optical receiver 185 can also include a local optical oscillator 187 connected to transmit a portion of the input light (e.g., light 132) to one of the optical input ports (e.g., one of the first 115 or second 117 input ports) of the optical mixer 110.

In some embodiments, such as any of the apparatus embodiments discussed in the context of FIGS. 1-3, a portion of the input light (e.g., input light 130) includes a data-modulated optical signal and another portion of the input light (e.g., input light 132) includes a local-oscillator optical signal. The input light 103, 132 can be in any of common optical telecommunication wavelength bands, such as the Original (e.g., about 1260 to about 1360 nm), Extended (e.g., about 1360 to about 1460 nm), Short (e.g., about 1460 to about 1530 nm), Conventional (C-band, e.g., about 1530 to about 1565 nm), Long (from e.g., 1565 to about 1625 nm) or Ultralong (e.g., about 1625 to about 1675) wavelength bands.

In some such embodiments, one of the first signal 162 or second signal 164 are indicative of different phase components. For example, the first signal 162 may be indicative of the modulation of the in-phase (I) component of the data-modulated optical signal, and the second signal 164 may be indicative of the quadrature-phase (Q) component of the data-modulated optical signal. Alternatively, the first and second signals 162 and 164 may simply be indicative of different and independent combinations of the I and Q phase components of the received optical signals so that the two signals 162, 164 can be processed together to recover separate data modulated on the I and Q phase-components of the optical signal by an optical transmitter thereof.

Some embodiments of the apparatus can include a digital signal processor (DSP) 190 configured to receive the signals 162, 164 and recover a data stream modulated onto the optical carrier light input 130 received at the optical input port 115 of the mixer 110.

In some embodiments, such as any of the apparatus embodiments discussed in the context of FIGS. 1-3, the first and the second input signals superpose with a relative phases of multiples of 120 degree phase with respect to each other at the first, second and third output ports 120, 122, 124 of the optical mixer 110. For instance, if the input light 130, 132 have a relative phase of zero to form the light mixture 129 of the third output port 124, then the input light 130, 132 superpose with relative phases of +120 degree and −120 degree to form the light mixture 125 at the first output port 120 of the mixer 110, and, of the light mixture 127 at the second output port 122 of the mixer 110.

However, embodiments of the photodiodes 105, 106, 107, 108 can be configured such that photocurrent generated is independent of the different relative phases of the mixtures of light 125, 127, 129. That is, the amplitudes of the resulting photocurrents emitted by the photodiodes 105, 106, 107, 108 are not dependent on the phase orientations of the incoming mixtures of light 125, 127, 129. For instance, the inputs of the photodiodes 105, 106, 107, 108 can be arranged to eliminate optical phase dependence in the photocurrent by adjusting incoming angles of the inputs of the light 125, 127, 129 such that they are counter-propagating. For instance, the input of the part of the first mixture of light 125 and the input of the part of the second mixture of light 127 transmitted to the first photodiode 105 are configured so as to be counter-propagating with respect to each other, e.g., by propagating into the first photodiode 105 from opposite directions. For instance, the photon absorbing material of the photodiodes (e.g., Ge, InP, Si materials, depending on the wavelength of the light 125, 127, 129) can be configured to be counter-propagating.

In some embodiments, such illustrated in FIGS. 2-3, the photodiodes 105 . . . 108 are separately connected to the optical mixer output ports 120, 122, 124 and the first and second power splitters 140 150 output ports 146, 148, 156, 158 by output waveguides 230 . . . 238 that have a substantially same optical path length as each other. For instance, to transmit part of first light mixture 125 from the optical mixer output port 120, the first photodiode 105 is connected via a first output waveguide 230 to the first optical output port 146 of the first optical power splitter 140. To transmit part of the second light mixture 127 from the optical mixer output port 122, the first photodiode 107 is further connected via a second output waveguide 232 that is connected to the first output port 156 of the second optical power splitter 150. To transmit the different third light mixture 129, the second photodiode 164 is connected via a third waveguide 234 to the third output port 124 of the optical mixer 110. To transmit the remaining part the first light mixture 125, the third photodiode 107 is connected via a fourth output waveguide 236 to the other or second output port 148 of the first optical power splitter 140. To transmit the remaining part of the second light mixture 127, the fourth photodiode 108 is connected via a fifth output waveguide 238 to the other or second output port 158 of the second 1×2 optical splitter 150

For instance, to transmit the part of one of the mixtures of light (e.g., part of first light mixture 125 from the optical mixer output port 120), the first photodiode 105 is connected to a first output waveguide 230 that is connected to the one optical output port (e.g., the first optical output port 146) of the first optical power splitter 140, to transmit the part of the another one of the mixtures of light (e.g., part of the second light mixture 127 from the optical mixer output port 122), the first photodiode 107 is further connected to a second output waveguide 232 that is connected to the one optical output port (e.g., the first output port 156) of the second optical power splitter 150, to transmit a different one of the mixtures of light (e.g., the third light mixture 129) the second photodiode 164 is connected to a third waveguide 234 that is connected to the third output port 124 of the optical mixer 110, to transmit the remaining part of the one mixture of light (e.g., the remaining part the first light mixture 125), the third photodiode 107 is connected to a fourth output waveguide 236 that is connected to the other one of the optical output ports (e.g., second output port 148) of the first optical power splitter 140, and to transmit the remaining part of the another of the mixtures of light (e.g., the remaining part of the second light mixture 127), the fourth photodiode 108 is connected to a fifth output waveguide 238 that is connected to the other one of the output ports (e.g., second output port 158) of the second 1×2 optical splitter 150.

In some such embodiments, to ensure that the optical inputs from the first, second and third mixtures of light 125, 127, 129 arrive at the first, second, third and fourth photodiodes 105, 106, 107, 108 at the same time, to thereby maintain the integrity of data-modulated input light 130, the first, second, third, fourth and fifth output waveguides 230, 232, 234, 236, 238 have a substantially same optical path length. For instance, in various embodiments, the differences in the optical path lengths of the waveguides 230, 232, 234, 236, 238 are constrained by fractions of the path length that light propagates in the waveguides 230, 232, 234, 236, 238 in a time of the symbol duration of data modulated signal passing through the waveguides 230, 232, 234, 236, 238. In some embodiments, the fraction can be within ±10, ±5, ±2, ±1, ±0.1, or 0.01 percent of the path length that light propagates in the waveguides 230, 232, 234, 236, 238 in a time of the symbol duration of data modulated signal passing through the waveguides 230, 232, 234, 236.

In some embodiments, such illustrated in FIGS. 2-3, the input light 130, 132 can be transmitted to the optical input ports 115, 117 of the optical mixer 110 through first and second optical input waveguides 240, 242, respectively. As further illustrated, one or both of the first and second optical input waveguides 240, 242 can be optically coupled to a polarization tracker 245. The polarization tracker 245 can be configured to align the polarization of the two input lights 130 and 132.

In some embodiments, in a full polarization diversity receiver apparatus configuration, a second coherent optical receiver 185 of the apparatus 100 can be used in combination with the first coherent optical receiver 185 of the apparatus 100, to receive the orthogonal polarization components of the dual-polarization modulated optical signal. A polarization beam splitter can be used to direct the orthogonal polarization components of the data modulated signal to the input ports 130 of the first and the second coherent receiver 180 of apparatus 100. One skilled in the pertinent art would understand how embodiments of the polarization tracker 245 (e.g., polarization beam splitters) could be monolithically integrated into the substrate 180, e.g., as part of the coherent optical receiver 185. In some embodiments, two coherent optical receivers 185 could share a digital signal processor in which the digitalization of the electrical signals 162, 164 of each of the coherent optical receivers 185 are processed together to recover the data streams carried by orthogonal polarization components of the transmitted optical signal.

In some embodiments, the optical mixer 110 can be configured as a multi-mode interferometric (MMI) coupler, e.g., a passive 2×3 MMI coupler with two or more input ports 115, 117 and three or more output ports 120, 122, 124. One skilled in the in the pertinent art would understand how the positions of the input ports 115, 117 output ports 120, 122, 124 and the length and width of the MMI coupler could be adjusted to provide the desired homogenous mixing of the light (e.g., input lights 130, 132) and provide 120 degree relative phase orientation of between the input lights as the first, second and third mixtures of light 125, 127, 129, output by such an MMI configuration of the optical mixer 110.

In some embodiments, as illustrated in FIG. 3 (but also applicable to any embodiments discussed in the context of FIGS. 1-2) the optical mixer 110 can includes three waveguide cores 330, 332, 334 (e.g., optical fiber cores or optical planar waveguide cores in some embodiments), each of the waveguide cores 330, 332, 334 optically end-coupled to different ones of the optical output ports 120, 122, 124, wherein the three waveguide cores are configured to mix the input light 130, 133 to form the first, second and third mixtures of light 125, 127, 129 transferred to the optical output ports 120, 122, 124. For instance the adjacent ones of the three waveguide cores can have a separation distance that is small enough to facilitate mixing of the input light 130, 132 (e.g., via evanescent light) to form the first, second and third mixtures of light 125, 127, 129.

In some embodiments, such as shown in FIG. 1, the optical mixer 110 can be configured as a 2×3 optical mixer consisting of two input ports 115, 117 and the three output ports 120, 122, 124. One skilled in the art would appreciate that, in some embodiments, the optical mixer 110 could have a greater number of input or output ports that are open, that is the additional port(s) are not connected to receive light or to transmit light. For instance, as illustrated in FIGS. 2-3 the optical mixer 110 can include a third input port 270, e.g., the optical mixer 110 can be configured as a 3×3 optical mixer.

As further illustrated in FIGS. 2-3, as part of being optically configured to transmit part of one of the mixtures of light 125, 127, 129, from one of the optical output ports 120, 122, 124 of the optical mixer 110 the first and second optical power splitters 140, 150, the apparatus 100 can further include a first transfer waveguide 260 to connect one of the optical output ports (e.g., port 120) to the input port 142 of the first optical power splitter 140, and, second transfer waveguide 262 to connect another one of the optical output ports (e.g., port 122) to the input port 152 of the second optical power splitter 140

The optical power splitters 140, 150 discussed in the context of FIG. 1-3 can be any passive power coupler device, or combination of such devices, familiar to those skilled in the pertinent art, e.g., a planar optical power splitters and/or passive power dividers or active tunable power dividers.

The waveguides 230-238, 240-242, 260-262 discussed in the context of FIG. 2-3 can be configured as any type of optical waveguide as familiar to one skilled in the pertinent art, e.g., buried planar waveguides, ridge waveguides, or fiber optical waveguides to carry single-mode or multi-mode configurations of light.

Those skilled in the art to which this application relates will appreciate that other and further additions, deletions, substitutions and modifications may be made to the described embodiments.

What is claimed is:

1. An apparatus, comprising:
    first, second, third and fourth photodiodes;
    an optical mixer having two or more optical input ports, having three optical output ports and being configured to output first, second and third mixtures of light, respectively, corresponding to input light received from the optical input ports, and transferred to the optical output ports;
    a first optical power splitter having an input optical port and first and second optical output ports, the first optical power splitter being optically configured to transmit part of one of the mixtures of light from one of the optical output ports of the first optical power splitter to the first photodiode and to transmit a remaining part of the one of the mixture of light from the other one of the optical output ports of the first optical power splitter to the third photodiode;
    a second optical power splitter having an input optical port and first and second optical output ports, the second optical power splitter being optically configured to transmit part of another one of the mixtures of light from one of the optical output ports of the second optical power splitter to the first photodiode and to transmit a remaining part of the other one of the mixtures of light from the other one of the optical output ports of the second optical power splitter to the fourth photodiode; and
    wherein the third optical output port of the optical mixer is connected to transmit a different one of the mixtures of light to the second photodiode.

2. The apparatus of claim 1, further comprising an electrical circuit connected to the first, second, third and fourth photodiodes such that the electrical circuit is configured to output a first signal indicative of a difference of optical powers measured by the first and second photodiodes and to output a second signal indicative of a difference of optical powers measured by the third and fourth photodiodes.

3. The apparatus of claim 2, wherein the first photodiode and the second photodiode are electrically connected to each other in series, and wherein the third photodiode and the fourth photodiode are electrically connected to each other in series.

4. The apparatus of claim 3, wherein the first and second photodiodes are configured as a first balanced detector wherein the first photodiode and the second photodiode are electrically connected to each other in series, and the third and fourth photodiodes are configured as a second balanced detector wherein the third photodiode and the fourth photodiode are electrically connected to each other in series.

5. The apparatus of claim 2, wherein electrical output from a series connection between the first and second photodiodes outputs the first signal and electrical output from the series connection between the third and fourth photodiodes outputs the second signal.

6. The apparatus of claim 2, further including first and second differential amplifiers, the first and second photodiodes being connected to different inputs of the first differential amplifier, and third and fourth photodiodes being connected to different inputs of the second differential amplifier.

7. The apparatus of claim 6, wherein the first and second differential amplifiers are each configured as transimpedance amplifiers.

8. The apparatus of claim 1, further including a substrate having a planar major surface, the optical mixer and the first and second optical power splitters being monolithically integrated to the substrate along the planar major surface.

9. The apparatus of claim 2, further including a substrate having a planar major surface, the optical mixer and the optical power splitters being monolithically integrated to the substrate along the planar major surface and the electrical circuit located on the planar major surface.

10. The apparatus of claim 1, further including a coherent optical receiver, the coherent optical receiver including the first, second, third and fourth photodiodes, the optical mixer, and the optical power splitters, and a local optical oscillator connected to transmit light to one of the optical input ports of the optical mixer.

11. The apparatus of claim 2, further including a coherent optical receiver, the coherent optical receiver including the first, second, third and fourth photodiodes, the optical mixer, and the optical power splitters, and a local optical oscillator connected to transmit light to one of the optical input ports of the optical mixer.

12. The apparatus of claim 1, further comprising a local optical oscillator and
    wherein one of the optical inputs of the optical mixer is configured to receive a data-modulated optical signal from an optical fiber and another of the optical inputs of the optical mixer is connected to receive light from the local-oscillator.

13. The apparatus of claim 1, further comprising:
    an electrical circuit connected to the first, second, third and fourth photodiodes such that the electrical circuit is configured to output a first signal indicative of a difference of optical powers measured by the first and second photodiodes and to output a second signal indicative of a difference of optical powers measured by the third and fourth photodiodes, wherein the first signal and the second signal corresponds to measurements of two linearly independent combinations of the in-phase and quadrature-phase components of the data-modulated optical signal.

14. The apparatus of claim 1, wherein the first, second and third mixtures of light, output by the optical mixer have a same intensity therein of light received at one of the input ports of the optical mixer.

15. The apparatus of claim 1, wherein two of the mixtures of light, output by the optical mixer combined light from the input ports of the optical mixer with relative phases of about +120 degrees and about −120 degrees.

16. The apparatus of claim 1, wherein the photodiodes are separately connected to the optical output ports of the first and second power optical splitters by output waveguides that have a substantially same optical path length as each other.

17. The apparatus of claim 2, further comprising a digital signal processor configured to determine a data stream modulated onto an optical carrier received at one of the optical input ports of the optical mixer based on the first and second signals output by the electrical circuit.

18. The apparatus of claim 1, wherein the input light is transmitted to the optical input ports of the optical mixer through first and second optical input waveguides, respectively, and one or both of the first and second optical input waveguides are optically coupled to a polarization tracker configured to align a polarization component of two or more input lights.

19. The apparatus of claim 1, wherein the optical mixer is a multi-mode interferometric coupler.

20. The apparatus of claim 1, wherein the optical mixer includes three waveguide cores, each of the three waveguide cores optically end-coupled to different ones of the optical output ports, wherein the three waveguide cores are configured to mix the input light received from first and second ones of the optical input ports of the optical mixer.

* * * * *